(12) United States Patent
Adachi et al.

(10) Patent No.: US 8,724,122 B2
(45) Date of Patent: May 13, 2014

(54) BEAD INSPECTION METHOD, AND BEAD INSPECTION APPARATUS

(75) Inventors: Hironari Adachi, Toyota (JP); Naohiro Kubo, Toyota (JP); Masayuki Azuma, Toyota (JP); Masahiro Nishio, Miyoshi (JP); Masaki Tanzawa, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/581,228

(22) PCT Filed: Feb. 22, 2011

(86) PCT No.: PCT/IB2011/000356
§ 371 (c)(1),
(2), (4) Date: Aug. 24, 2012

(87) PCT Pub. No.: WO2011/104608
PCT Pub. Date: Sep. 1, 2011

(65) Prior Publication Data
US 2012/0314225 A1    Dec. 13, 2012

(30) Foreign Application Priority Data
Feb. 25, 2010    (JP) ................................ 2010-040063

(51) Int. Cl.
*G01B 11/28* (2006.01)
(52) U.S. Cl.
USPC ........................................................ 356/630
(58) Field of Classification Search
USPC ..................................... 356/630; 250/559.27
See application file for complete search history.

(56) References Cited

U.S. PATENT DOCUMENTS

| 6,232,572 B1 * | 5/2001 | Kanjo ........................... 219/110 |
| 6,541,757 B2 * | 4/2003 | Bieman et al. ................. 250/221 |

(Continued)

FOREIGN PATENT DOCUMENTS

| JP | 4 295747 | 10/1992 |
| JP | 4 346011 | 12/1992 |

(Continued)

OTHER PUBLICATIONS

Japanese Office Action Issued Sep. 21, 2011 in JP Patent Application No. 2010-040063 Filed Feb. 25, 2010 (with partial English translation).

(Continued)

*Primary Examiner* — Roy M Punnoose
(74) *Attorney, Agent, or Firm* — Oblon, Spivak, McClelland, Maier & Neustadt, L.L.P.

(57) ABSTRACT

A bead inspection step and a bead inspection apparatus that inspect the quality of a bead are disclosed . . . . The bead inspection apparatus includes a wire-feed-speed measurement device that measures the feed speed of a brazing wire, and an analysis portion that measures and analyzes position coordinate data about surfaces of a first, workpiece, a second workpiece and the bead, and performs a first shape data measurement step of. measuring first shape data before brazing, a second shape data measurement step of measuring second shape data after the brazing, a feature quantity calculation step of calculating predicted values of feature quantities based on the first and second shape data and the brazing wire feed speed, and a throat thickness calculation step of calculating a predicted value of the throat thickness by a regression expression formed based on actual measurements of the feature quantities and of the throat thickness.

14 Claims, 14 Drawing Sheets

(56) References Cited

U.S. PATENT DOCUMENTS

| | | |
|---|---|---|
| 6,937,329 B2 * | 8/2005 | Esmiller .................... 356/237.2 |
| 2002/0113198 A1 * | 8/2002 | Bieman et al. ................ 250/221 |
| 2004/0032597 A1 * | 2/2004 | Esmiller ....................... 356/636 |

FOREIGN PATENT DOCUMENTS

| | | |
|---|---|---|
| JP | 5 87539 | 4/1993 |
| JP | 9 79833 | 3/1997 |
| JP | 9 220667 | 8/1997 |
| JP | 2000 15474 | 1/2000 |
| JP | 2001 208523 | 8/2001 |
| JP | 3858792 | 12/2006 |
| JP | 2009 220155 | 10/2009 |
| JP | 2009 294093 | 12/2009 |
| RU | 2 191 670 | 10/2002 |

OTHER PUBLICATIONS

International Search Report Issued Apr. 17, 2012 in PCT/IB11/000356 Filed Feb. 22, 2011.

* cited by examiner

FIG.1
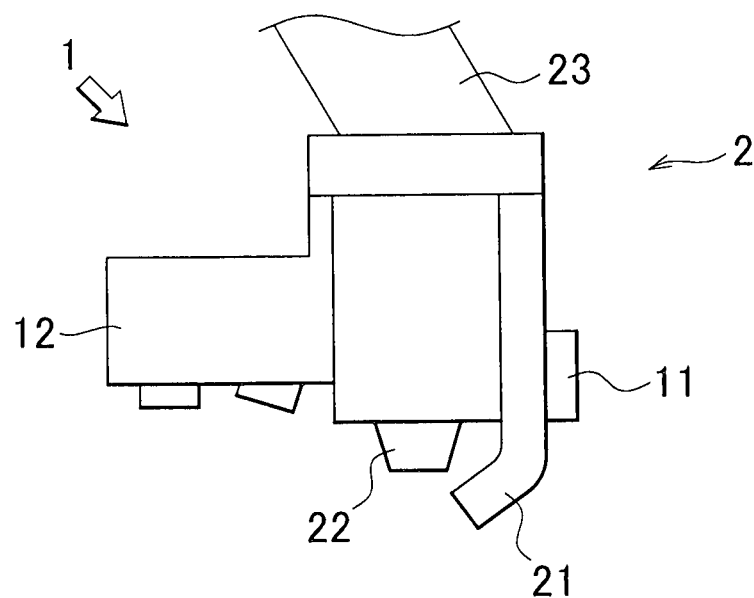
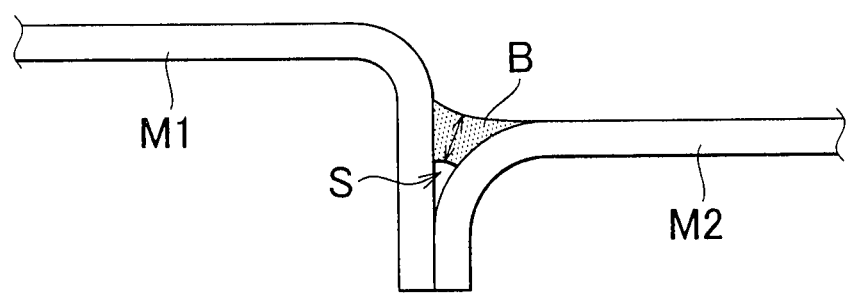

F I G . 13
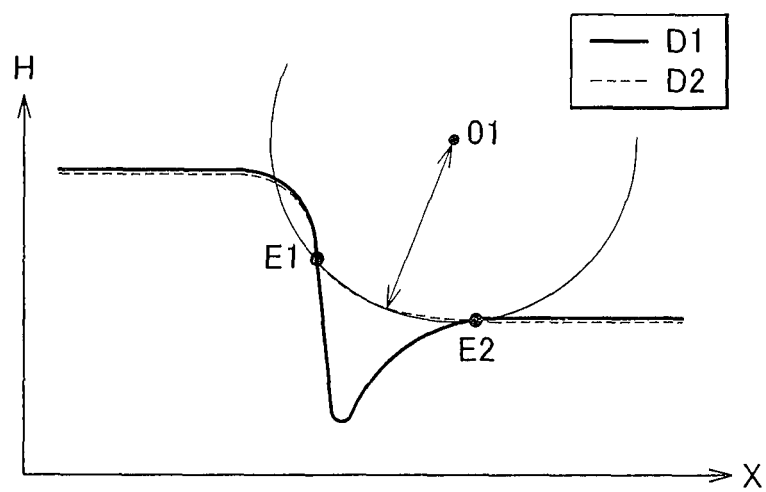
F I G . 14
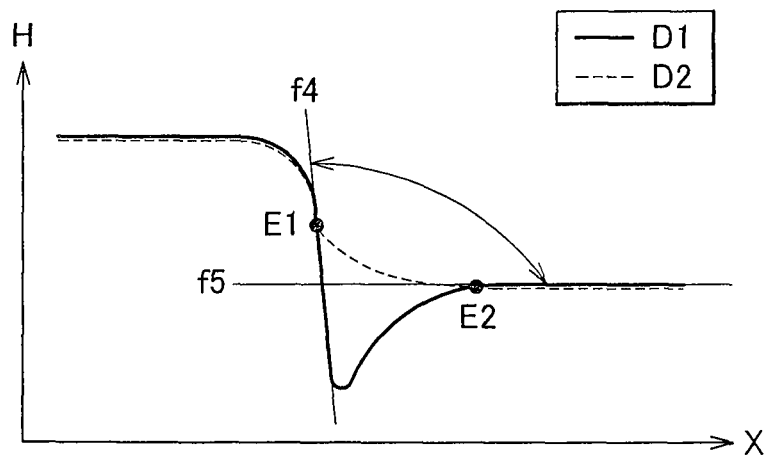

BEAD INSPECTION METHOD, AND BEAD INSPECTION APPARATUS

BACKGROUND OF THE INVENTION

1. Field of the Invention

The invention relates to a bead inspection method and a bead inspection apparatus for inspecting the quality of a bead that is formed when a plurality of metal workpieces are joined by brazing.

2. Description of the Related Art

As for a related-art technology, brazing is known as a technique of joining a plurality of metal workpieces. For example, the brazing is a technique as shown in FIG. 21 in which a first workpiece M1 and a second workpiece M2 that are metal plates curved at about 90° are joined by placing the two workpieces M1 and M2 in contact with each other at their up-down-direction flat portions (flat portions extending in a vertical direction in FIG. 21) while a left-right-direction flat portion of the first workpiece M1 (a flat portion thereof extending in a horizontal direction in FIG. 21) is placed higher than a left-right-direction flat portion of the second workpiece M2 (a flat portion thereof extending in the horizontal direction in FIG. 21), and then introducing an alloy (solder) melted by laser or the like into a space S that is formed between the up-down-direction flat portion of the first workpiece M1 and a curved portion of the second workpiece M2 so as to form a bead B that extends between the up-down-direction flat portion of the first workpiece M1 and the curved portion of the second workpiece M2.

After the brazing as described above is performed, it is inspected whether or not the bead B has a predetermined strength. The inspection about the bead B includes measuring the throat thickness of the bead B (the smallest size of a dimension between the obverse and reverse surfaces of the bead B) and determining whether or not the throat thickness satisfies a certain criterion.

Since the throat thickness of the bead B is difficult to directly measure, the bead B of an extracted sample is cut and a throat thickness is measured on the cut cross-section. Therefore, an increased number of man-hours for the bead B inspection, an increased number of waste works, etc., are brought about, so that the cost for the inspection rises and therefore the manufacturing cost of the product increases.

Japanese Patent Application Publication No. 9-79833 (JP-A-9-79833) discloses a technology which employs a probe that moves in contact with a bead as an inspection object and that sends and receives ultrasonic waves, and which therefore non-destructively measures the throat thickness of the bead by using ultrasonic waves. However, the technology described in the literature JP-A-9-79833 is not able to obtain a desirable result when the inspection-object bead is small relative to the probe.

SUMMARY OF THE INVENTION

The invention provides a bead inspection method and a bead inspection apparatus capable of calculating the throat thickness of a bead as an inspection object in a non-destructive manner, regardless of the size of the inspection object.

A first aspect of the invention relates to a bead inspection method of inspecting quality of a bead that is formed by melting a brazing wire that is substantially continuously supplied to a joining portion between a plurality of metal workpieces so as to braze the metal workpieces to each other. This bead inspection method includes: forming a regression expression based on an actual measurement of a feature quantity that is information about a shape of a specific portion of the metal workpieces and the bead and that affects throat thickness of the bead, and on an actual measurement of the throat thickness corresponding to the actual measurement of the feature quantity; calculating a predicted value of the throat thickness by the regression expression; and determining whether or not the bead is good by comparing the predicted value of the throat thickness with a pre-set criterion value.

In the bead inspection method in accordance with this aspect, the plurality of metal workpieces may be two metal plates, and the bead may be formed in a space that is formed by placing the two metal plates so that surfaces of the two metal plates are near to each other, one metal plate of which is curved in a direction away from the other metal plate, and the feature quantity may include at least one of bead width, bead height difference, bead end position difference, bead shrinkage depth, bead shrinkage curvature radius, lower surface angle, lower curvature radius, plate gap and bead's cross-sectional area.

In the bead inspection method in accordance with the foregoing aspect, the feature quantity may include the bead height difference, the bead shrinkage depth, and the bead's cross-sectional area.

In the bead inspection method in accordance with the aspect, a predicted value of the bead's cross-sectional area may be calculated by a regression expression that is formed based on supply speed of the brazing wire and an actual value of the bead's cross-sectional area.

In the bead inspection method in accordance with the aspect, the feature quantity may be information about a shape of the metal workpieces and the bead which is acquired from outside the metal workpieces and the bead without destroying any one of the metal workpieces nor the bead.

In the bead inspection method in accordance with the aspect, the throat thickness of the bead may be a smallest size of a dimension of the bead between a brazing surface of the bead and a surface opposite the brazing surface in a cross-sectional plane of the bead that is perpendicular to a brazing direction in which the metal workpieces are brazed to each other.

In the bead inspection method in accordance with the aspect, determining whether or not the bead is good may be determining whether or not the predicted value of the throat thickness satisfies a criterion.

In the bead inspection method in accordance with the aspect, determining whether or not the bead is good may be determining whether or not the predicted value calculated about the throat thickness is within a range between a pre-set upper-limit value and a pre-set lower-limit value.

A second aspect of the invention relates to a bead inspection apparatus that inspects quality of a bead that is formed by melting a brazing wire that is substantially continuously supplied to a joining portion between a plurality of metal workpieces so as to braze the metal workpieces to each other. This bead inspection apparatus includes: a wire-supply-speed measurement portion that measures supply speed of the brazing wire that is substantially continuously supplied to the joining portion between the metal workpieces; and an analysis portion that measures and analyzes position coordinate data about surfaces of the metal workpieces and of the bead, wherein the analysis portion measures first shape data that is data regarding position coordinates of surfaces of the metal workpieces that include the joining portion in a state prior to brazing, and measures, at same position a position at which the first shape data is measured, second shape data that is data regarding position coordinates about the surfaces of the metal workpieces and of the bead after the brazing, and calculating a predicted value of a feature quantity that is information regarding a shape of a specific portion of the metal workpieces and of the bead and that affects a throat thickness of the bead, based on the first shape data, the second shape data, and the supply speed of the brazing wire, and calculates a predicted value of the throat thickness by substituting the predicted value of the feature quantity in a regression expression formed based on an actual measurement of the feature quantity and an actual measurement of the throat thickness corresponding to the actual measurement of the feature quantity, and then determines whether or not the bead is good by comparing the predicted value of the throat thickness with a pre-set criterion value.

In the bead inspection apparatus in accordance with this aspect, the feature quantity may be information about a shape of the metal workpieces and the bead which is acquired from outside the metal workpieces and the bead without destroying any one of the metal workpieces nor the bead.

In the bead inspection apparatus in accordance with the aspect, the throat thickness of the bead may be a smallest size of a dimension of the bead between a brazing surface of the bead and a surface opposite the brazing surface in a cross-sectional plane of the bead that is perpendicular to a brazing direction in which the metal workpieces are brazed to each other.

In the bead inspection apparatus in accordance with the aspect, determining whether or not the bead is good may be determining whether or not the predicted value of the throat thickness satisfies a criterion.

In the bead inspection apparatus in accordance with the aspect, determining whether or not the bead is good may be determining whether or not the predicted value calculated about the throat thickness is within a range between a pre-set upper-limit value and a pre-set lower-limit value.

According to the invention, it becomes possible to calculate the throat thickness of the bead non-destructively, regardless of the size of the detection object. Therefore, the quality of the bead can be inspected at low cost.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a diagram showing a bead inspection apparatus in accordance with an embodiment of the invention;

FIG. 13 is a diagram showing the bead shrinkage curvature radius;

FIG. 14 is a diagram showing the lower surface angle;

DETAILED DESCRIPTION OF EMBODIMENTS

Figure 2:
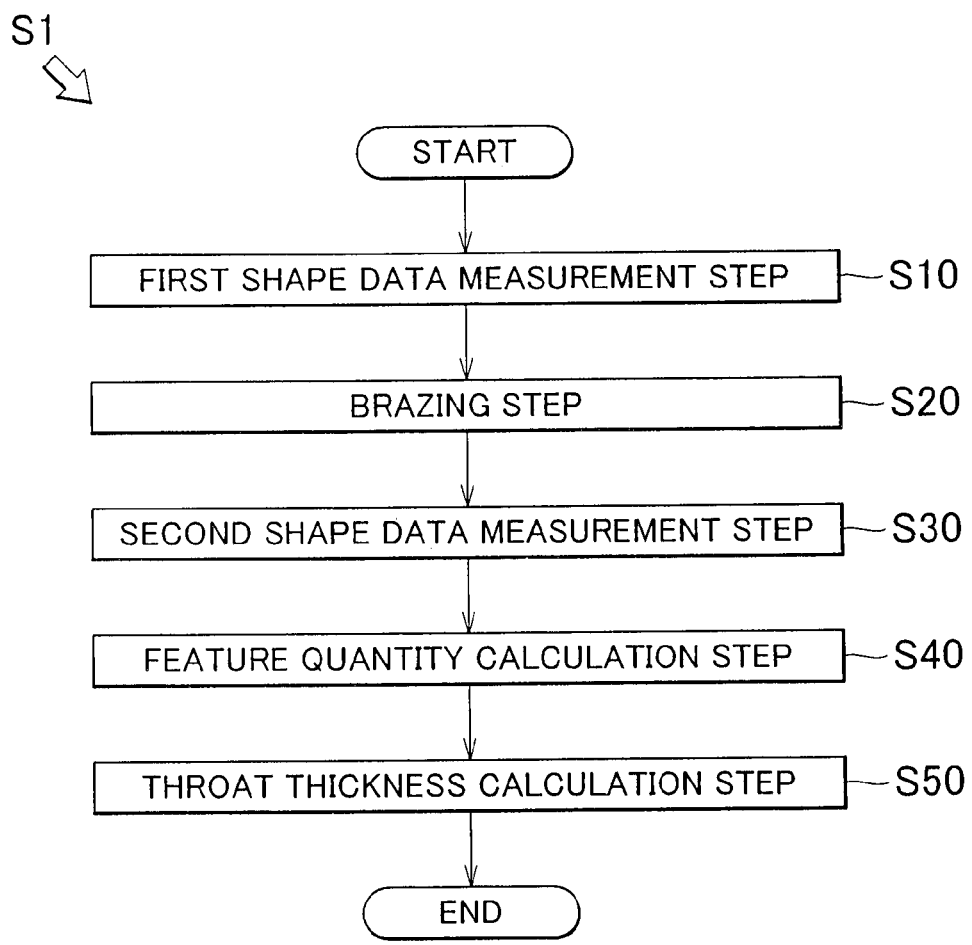
FIG. 2 is a flowchart showing a bead inspection method in accordance with an embodiment of the invention.

A bead inspection apparatus 1 in accordance with an embodiment of the invention will be hereinafter described with reference to FIG. 1. The bead inspection apparatus 1 calculates a predicted value of a throat thickness [mm] of a bead B formed when a first workpiece M1 and a second workpiece M2 are joined on the basis of information about the shapes of the first workpiece M1, the second workpiece M2 and a specific portion of the bead B, and determining whether or not the predicted value of the throat thickness [mm] satisfies a certain criterion. The junction of the first workpiece M1 and the second workpiece M2 is carried out by placing the first workpiece M1 and the second workpiece M2, which are metal plates curved at about 90°, in contact with each other at their up-down-direction flat portions (flat portions extending in a vertical direction in FIG. 1) while a left-right-direction flat portion of the first workpiece M1 (a flat portion thereof extending in a horizontal direction in FIG. 1) is placed above a left-right-direction flat portion of the second workpiece M2 (a flat portion thereof extending in the horizontal direction in FIG. 1), and then forming a bead B in a space S (joining portion) formed between the up-down-direction flat portion of the first workpiece M1 and a curved portion of the second workpiece M2 by brazing that is performed by a brazing apparatus 2. It is to be noted herein that the "throat thickness" of the bead B in this embodiment means the size of a transverse dimension of a thinnest portion of the bead B, specifically, the smallest size of a transverse dimension of the bead B between the brazing surface of the bead B and the opposite-side surface thereof in a cross-sectional view of the bead B that is taken on a plane perpendicular to the brazing direction (see a portion indicated by a two-head arrow). Incidentally, in the following description, the up-down direction in FIG. 1 is defined as an up-down direction of the bead inspection apparatus 1 and the brazing apparatus 2, and the left-right direction in FIG. 1 is defined as a left-right direction of the bead inspection apparatus 1 and the brazing apparatus 2, and the near side in the drawing of FIG. 1 is defined as a front of the bead inspection apparatus 1 and the brazing apparatus 2, and the far side in the drawing of FIG. 1 is defined as a rear of the bead inspection apparatus 1 and the brazing apparatus 2.

As shown in FIG. 1, the bead inspection apparatus 1 is equipped with a wire-feed-speed measurement device 11 and an analysis portion 12, and is attached integrally to the brazing apparatus 2, which is equipped with a wire feed portion 21, a melting portion 22 and an arm portion 23.

The wire feed portion 21 of the brazing apparatus 2 is a portion from which a brazing wire W that is a wire made of an alloy (solder) is continuously fed into a space S that is formed extending in the front-rear direction between the up-down-direction flat portion of the first workpiece M1 and the curved portion of the second workpiece M2. Incidentally, the brazing wire W supplied by the wire feed portion 21 is not particularly limited; for example, it may be a wire made of a Cu—Si—Mn alloy.

The melting portion 22 melts the brazing wire W supplied to the space S from the wire feed portion 21 by irradiating the brazing wire W with laser. The brazing wire W melted by the melting portion 22 solidifies in the space S to from a bead B and thus join the first workpiece M1 and the second workpiece M2. That is, the bead B is formed between the up-down-direction flat portion of the first workpiece M1 and the curved portion of the second workpiece M2. Incidentally, although this embodiment adopts a construction in which the brazing is carried out by laser, this is not restrictive; for example, it is permissible to adopt a construction in which brazing is carried out by arc discharge.

The arm portion 23 is a portion for holding the wire feed portion 21, the melting portion 22 and the bead inspection apparatus 1 integrally as one unit, and setting the wire feed portion 21, the melting portion 22 and the bead inspection apparatus 1 at desired positions and angles while maintaining their positional relations. Specifically, using the arm portion 23, it is possible to move the wire feed portion 21, the melting portion 22 and the bead inspection apparatus 1 in the front-rear direction above the space S. Furthermore, using the arm portion 23, it is also possible to switch between the angle at which the wire feed portion 21 and the melting portion 22 perform the brazing and the angle at which the bead inspection apparatus 1 measures data on the surface shape of the bead B (various values representing position coordinates of a surface of the bead B).

The wire-feed-speed measurement device 11 of the bead inspection apparatus 1 is attached to the wire feed portion 21 of the brazing apparatus 2, and is able to measure a wire feed speed [m/min] that is the speed at which the brazing wire W is discharged from the wire feed portion 21.

The analysis portion 12 includes a light source that emits a laser slit beam, and a CCD camera. The analysis portion 12 measures data on the surface shapes of the first workpiece M1, the second workpiece M2 and the bead B (various values representing position coordinates on surfaces) by the optical cutting method. The analysis portion 12 is attached to the melting portion 22 of the brazing apparatus 2. Besides, the analysis portion 12, on the basis of the surface shape data, calculates a predicted value of the throat thickness [mm] of the bead B, and determines whether or not the predicted value of the throat thickness [mm] satisfies a certain criterion (pass/fail determination regarding the throat thickness). Incidentally, although in this embodiment, the measurement of surface shape data is performed by the light cutting method through the use of the laser slit beam and the CCD camera, it is permissible to employ any other optical technique, such as a triangulation method or the like, as long as the method is able to measure the surface shape data.

Besides, in this embodiment, the wire-feed-speed measurement device 11 of the bead inspection apparatus 1 is attached to the wire feed portion 21 of the brazing apparatus 2, and the analysis portion 12 of the bead inspection apparatus 1 is attached to the melting portion 22 of the brazing apparatus 2, and thus the bead inspection apparatus 1 and the brazing apparatus 2 are integrated. However, the bead inspection apparatus 1 and the brazing apparatus 2 may be separate from each other.

A bead inspection step S1 that is a bead inspection method in accordance with this embodiment will be described hereinafter with reference to FIG. 2 to FIG. 20.

As shown in FIG. 2, the bead inspection step S1 includes a first shape data measurement step S10, a brazing step S20, a second shape data measurement step S30, a feature quantity calculation step S40, and a throat thickness calculation step S50.

Figure 3:
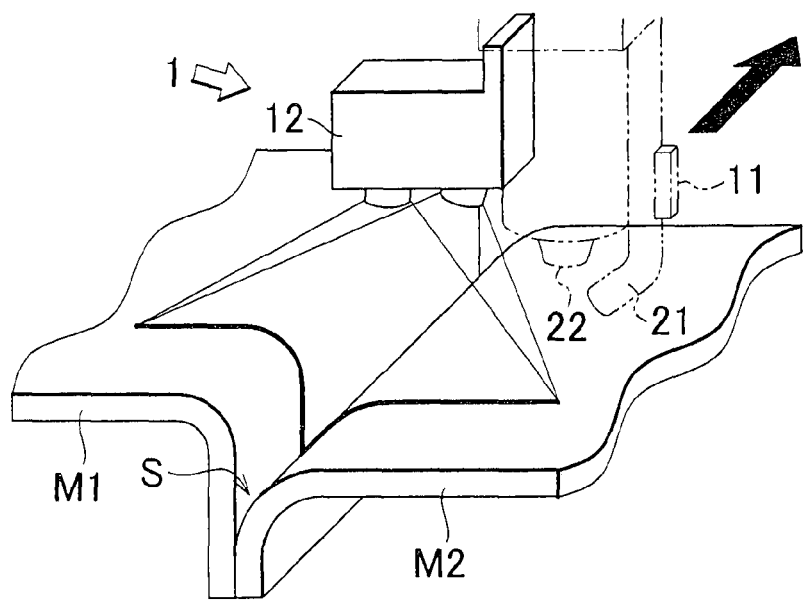
FIG. 3 is a diagram showing a first shape data measurement step.

The first shape data measurement step S10 is a step of measuring first shape data D1 that is surface shape data about the first workpiece M1 and the second workpiece M2 prior to the brazing junction. In the first shape data measurement step S10, as shown in FIG. 3, the first workpiece M1 and the second workpiece M2 are placed so that the surfaces of their up-down-direction flat portions are in contact with each other while the left-right-direction flat portion of the first workpiece M1 is positioned above, that is, higher than, the left-right-direction flat portion of the second workpiece M2, and then the first workpiece M1 and the second workpiece M2 are fixed. Next, using the arm portion 23 (see FIG. 1), the wire feed portion 21 and the melting portion 22 as well as the bead inspection apparatus 1 are set at angles at which the analysis portion 12 of the bead inspection apparatus 1 is able to measure the first shape data D1, and then are moved to a position at which to start measuring the first shape data D1. Then, the wire feed portion 21, the melting portion 22 and the bead inspection apparatus 1 are moved rearward at a constant speed (see an arrow in FIG. 3) above the space extending in the front-rear direction between the up-down-direction flat portion of the first workpiece M1 and the curved portion of the second workpiece M2. During this movement, the analysis portion 12 of the bead inspection apparatus 1 intermittently measures the first shape data D1.

Specifically, the analysis portion 12 measures a predetermined number of pieces (hereinafter, defined as "Nx" number of pieces) of position coordinate data about the surfaces (upper surfaces) of the first workpiece M1 and the second workpiece M2 at different locations in certain regions in the left-right direction on the surfaces (upper surfaces) of the first workpiece M1 and the second workpiece M2 (see a thick line shown on the surfaces of the first workpiece M1 and the second workpiece M2 in FIG. 3). The Nx number of pieces of position coordinate data obtained in the certain region is defined as "position coordinate data of one line"). Furthermore, the analysis portion 12, while moving rearward at the constant speed and shifting the measurement region rearward, performs the measurement of position coordinate data of one line at different locations in the moving direction a predetermined number of times (hereinafter, defined as "Ny"). Thus, the analysis portion 12 measures position coordinate data of Ny number of lines. That is, the first shape data D1 is position coordinate data of Ny number of lines, and is made up of Nx×Ny number of pieces of position coordinate data. Incidentally, the measurement of the first shape data D1 by the analysis portion 12 is set so that the space S in which a bead B is to be formed is included in the measurement region.

Figure 4:
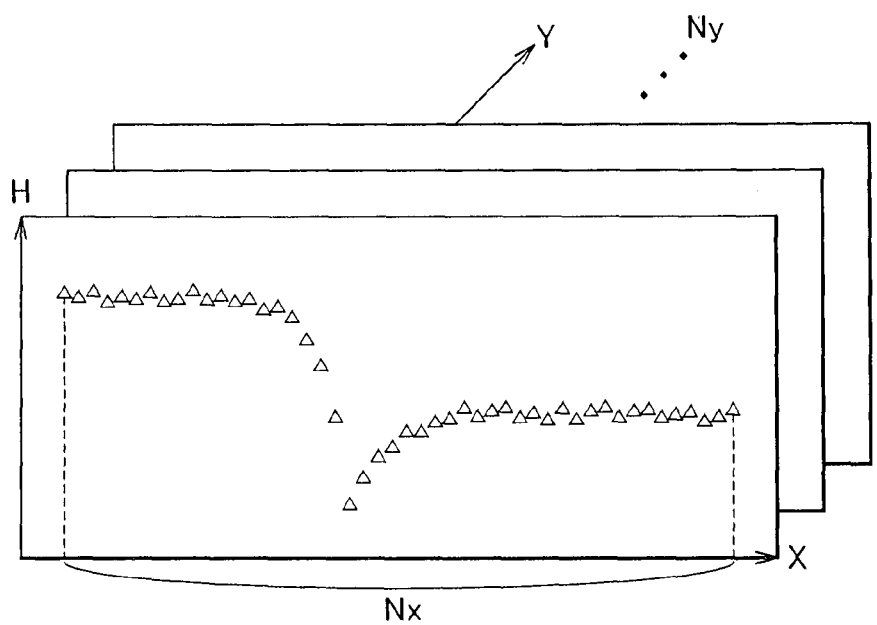
FIG. 4 is a diagram showing first shape data measured in the first shape data measurement step.

Then, a graph as shown in FIG. 4 is created by defining the left-right direction of the bead inspection apparatus 1 along an X axis, and defining the up-down direction along an H axis, and defining the front-rear direction along a Y axis, and plotting the measured pieces of the first shape data D1 (see triangles in FIG. 4). In FIG. 4, the two-dimensional coordinate system formed by the X axis and the H axis shows position coordinate data of one line in the first shape data D1, that is, Nx number of pieces of position coordinate data about a surface of a predetermined cross-sectional plane of the first workpiece M1 and the second workpiece M2 which is perpendicular to the front-rear direction. It is also shown in FIG. 4 that Ny number of pieces of position coordinate data of one line exist along the Y axis.

Figure 5:
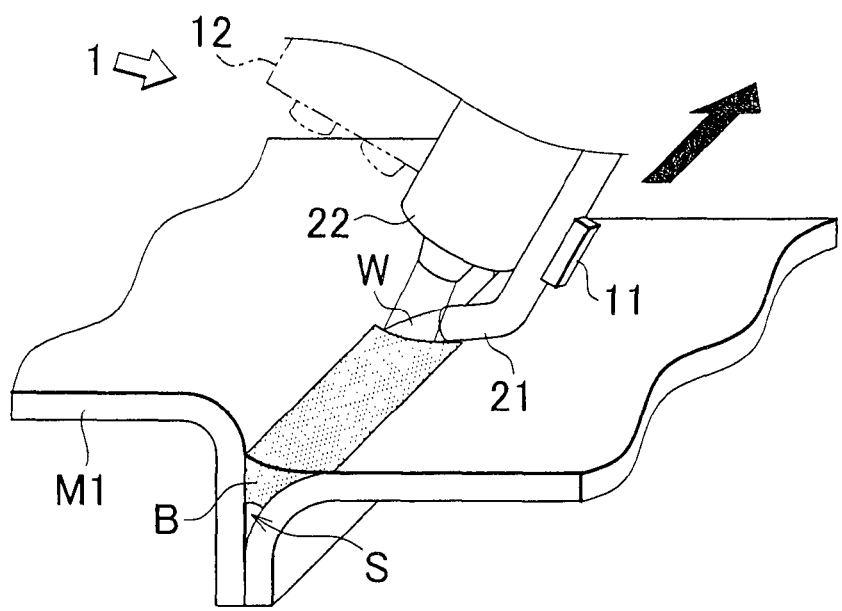
FIG. 5 is a diagram showing a brazing step.

The brazing step S20 is a step of joining the first workpiece M1 and the second workpiece M2 by brazing. As shown in FIG. 5, in the brazing step S20, the wire feed portion 21, the melting portion 22 and the bead inspection apparatus 1 are set at an angle that allows the wire feed portion 21 and the melting portion 22 to perform brazing, and are moved to a brazing start position. Then, while the wire feed portion 21, the melting portion 22 and the bead inspection apparatus 1 are moved rearward at a constant speed (see an arrow in FIG. 5) above the space S formed between the up-down-direction flat portion of the first workpiece M1 and the curved portion of the second workpiece M2, the brazing wire W is continuously supplied from the wire feed portion 21 to the space S1 along the front-rear direction, and the brazing wire W is melted by the laser emitted from the melting portion 22.

In this manner, the bead B is continuously formed in the front-rear direction between the up-down-direction flat portion of the first workpiece M1 and the curved portion of the second workpiece M2, joining the first workpiece M1 and the second workpiece M2. Incidentally, during the brazing operation performed by the wire feed portion 21 and the melting portion 22, the wire feed speed [m/min] is measured by the wire-feed-speed measurement device 11.

Figure 6:
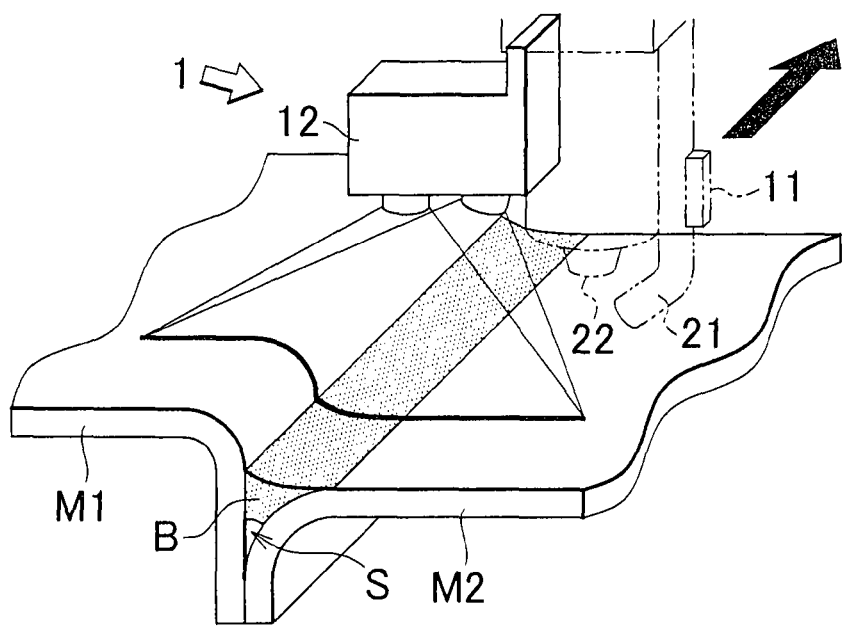
FIG. 6 is a diagram showing a second shape data measurement step.

The second shape data measurement step S30 is a step of measuring second shape data D2 that is surface shape data about the first workpiece M1 and the second workpiece M2 that have been joined by the brazing step S20, that is, the first workpiece M1, the second workpiece M2 and the bead B. As shown in FIG. 6, in the second shape data measurement step S30, using the arm portion 23 (see FIG. 1), the wire feed portion 21 and the melting portion 22 as well as the bead inspection apparatus 1 are set at an angle that allows the analysis portion 12 of the bead inspection apparatus 1 to measure the second shape data D2, and are moved to a measurement start position for the second shape data D2. The angle for measuring the second shape data D2 and the measurement start position for the second shape data D2 are set substantially the same as the angle for measuring the first shape data D1 and the measurement start position for the first shape data D1. Due to this setting, the measurement position for the first shape data D1 and the measurement position for the second shape data D2 are the same. Then, while the wire feed portion 21 and the melting portion 22 as well as the bead inspection apparatus 1 are moved rearward (see an arrow in FIG. 6) at the constant speed above the space S extending in the front-rear direction between the up-down-direction flat portion of the first workpiece M1 and the curved portion of the second workpiece M2, that is, above the bead B, the second shape data D2 is continuously measured by the analysis portion 12 of the bead inspection apparatus 1.

Specifically, as in the first shape data measurement step S10, the analysis portion 12 measures "Nx" number of pieces of position coordinate data about the surfaces (upper surfaces) of the first workpiece M1, the second workpiece M2 and the bead B at different locations in certain regions in the left-right direction on the surfaces (upper surfaces) of the first workpiece M1, the second workpiece M2 and the bead B (see a thick line shown on the surfaces of the first workpiece M1, the second workpiece M2 and the bead B in FIG. 6). Furthermore, as in the first shape data measurement step S10, the analysis portion 12, while moving rearward at the constant speed and shifting the measurement region rearward, performs the measurement of position coordinate data of one line at different locations in the moving direction Ny number of times. Thus, the analysis portion 12 measures position coordinate data of Ny number of lines. That is, the first shape data D1 is position coordinate data of Ny number of lines, and is made up of Nx×Ny number of pieces of position coordinate data. It is to be noted herein that in this embodiment, the measurement positions for the position coordinate data in the case of first shape data D1 is the same as the measurement positions for the position coordinate data in the case of second shape data D2.

Figure 7:
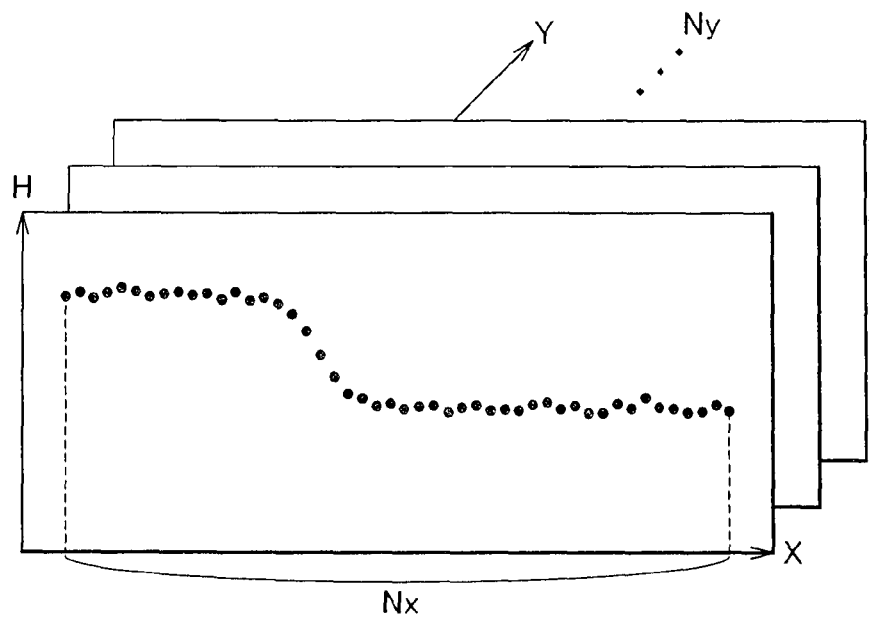
FIG. 7 is a diagram showing second shape data measured in the second shape data measurement step.

Thus, a graph as shown in FIG. 7 is created by defining the left-right direction of the bead inspection apparatus 1 along an X axis, and defining the up-down direction along an H axis, and defining the front-rear direction along a Y axis, and plotting the measured pieces of the second shape data D2 (see dots in FIG. 7). In FIG. 7, the two-dimensional coordinate system formed by the X axis and the H axis shows position coordinate data of one line in the second shape data D2, that is, Nx number of pieces of position coordinate data about a surface of a predetermined cross-sectional plane of the first workpiece M1, the second workpiece M2 and the bead B which is perpendicular to the front-rear direction. It is also shown in FIG. 7 that Ny number of pieces of position coordinate data of one line exist along the Y axis.

The feature quantity calculation step S40 is a step in which predicted values of feature quantities of the first workpiece M1, the second workpiece M2 and the bead B are calculated by the analysis portion 12 on the basis of the first shape data D1 and the second shape data D2 measured in the first shape data measurement step S10 and the second shape data measurement step S30 as well as on the wire feed speed [m/min]. The "feature quantities" herein are shape information that can be acquired non-destructively from outside, including the length or dimension of specific portions of the first workpiece M1, the second workpiece M2 and the bead B, angles, etc. Depending on their numerical values, the feature quantities affect the increase or decrease in the throat thickness [mm].

Figure 8:
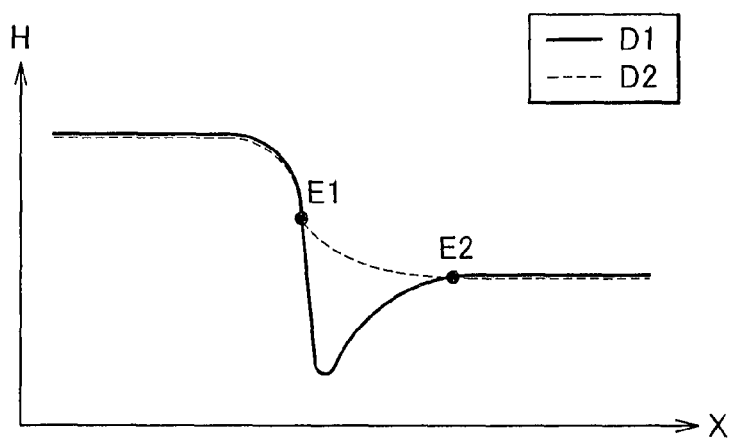
FIG. 8 is a diagram showing detection of two end portions of a bead that is carried out by superimposing the first shape data and the second shape data on each other.

As shown in FIG. 8, in the feature quantity calculation step S40, firstly two opposite end positions of the surface of the bead B in the left-right direction (hereinafter, simply referred to as "the two end portions of the bead B") are detected by superimposing the first shape data D1 obtained prior to the brazing and the second shape data D2 obtained following the brazing on each other with reference to position coordinate data that is common to the first shape data D1 and the second shape data D2 (e.g., data about a portion that corresponds to the left-right-direction flat portion of the first workpiece M1, etc.). (In FIG. 8, a point E1 shows the position coordinate of a left end portion of the surface of the bead B, and a point E2 shows the position coordinate of a right end portion of the surface of the bead B.) This operation is performed because, using only the second shape data D2, it is difficult to detect the two end portions of the bead B. That is, when the first shape data D1 and the second shape data D2 are superimposed on each other, the data about portions where the bead B is not formed, such as a portion that corresponds to the left-right-direction flat portion of the first workpiece M1, and the like, is the same between the first shape data D1 and the second shape data D2, but the data in the second shape data D2 that concerns a portion where the bead B is formed is not the same as the data in the first shape data D1 that concerns a portion that corresponds to the portion where the bead B is formed. Therefore, border points between portions about which the first shape data D1 and the second shape data D2 are the same and portions about which the first shape data D1 and the second shape data D2 are not the same can be detected as the two end portions of the bead B.

Thus, a line (portion) of the second shape data D2 from the point E1 to the point E2 shows the position coordinate data about the surface of the bead B, so that the position of the surface of the bead B can be specifically determined. Incidentally, for the sake of convenience in description, FIG. 8 shows only the positional coordinate data of one line in each of the first shape data D1 and the second shape data D2; specifically, a curve that approximates the position coordinate data of one line in the first shape data D1 is shown by a solid line, and a curve that approximates the position coordinate data of one line in the second shape data D2 is shown by a dotted line. Besides, if regarding a common portion of the workpieces that is unchanged between before the brazing and after the brazing, the position coordinate data in the first shape data D1 obtained before the brazing and the position coordinate data in the second shape data D2 obtained after the brazing are found to be different when the first shape data D1 and the second shape data D2 are superimposed, it is permissible to appropriately correct the first shape data D1 or the second shape data D2.

Next, nine kinds of feature quantities are calculated on the basis of the first shape data D11, the second shape data D2, etc. The nine kinds of feature quantities are bead width [mm], bead height difference [mm], bead end position difference [mm], bead shrinkage depth [mm], bead shrinkage curvature radius [mm], lower surface angle [rad], lower curvature radius [mm], plate gap [mm], and bead's cross-sectional area [mm$^2$]. Predicted values of the feature quantities are calculated for every one line (one cross-sectional plane), and Ny number of predicted values of each feature quantity are calculated. In the following description, each feature quantity will be described regarding only one line.

Figure 9:
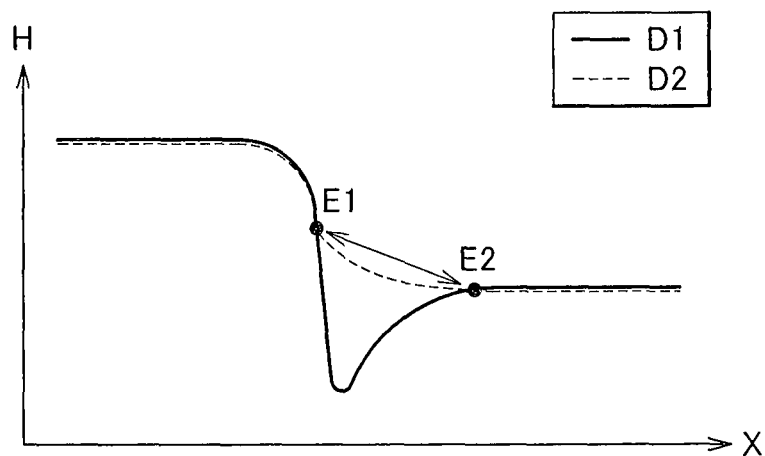
FIG. 9 is a diagram showing the bead width.

As a first feature quantity, the bead width [mm] will be described. The bead width [mm] is a feature quantity that represents the distance between the two end portions of the bead B. As shown in FIG. 9, a predicted value of the bead width [mm] can be found by calculating the distance between the point E1 and the point E2 on the basis of the first shape data D1 and the second shape data D2.

Figure 10:
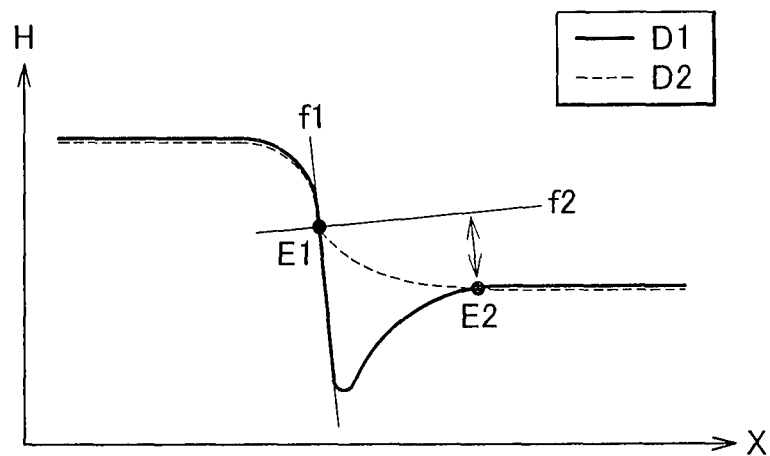
FIG. 10 is a diagram showing the bead height difference.

As a second feature quantity, the bead height difference [mm] will be described. The bead height difference [mm] is a feature quantity that represents the height difference between the two end portions of the bead B that is determined with reference to the up-down-direction flat portion of the first workpiece M1. As shown in FIG. 10, when a predicted value of the bead height difference [mm] is to be found, firstly an approximate straight line f1 that passes through the point E1 and that approximates a flat portion of the first shape data D1 that extends in an up-down direction (a portion that corresponds to the up-down-direction flat portion of the first workpiece MD is calculated. Next, a straight line f2 that passes through the point E1 and is orthogonal to the approximate straight line f1 is calculated. Finally, the shortest distance from the point E2 to the straight line f2 is calculated. In this manner, a predicted value of the bead height difference [mm] can be found.

Figure 11:
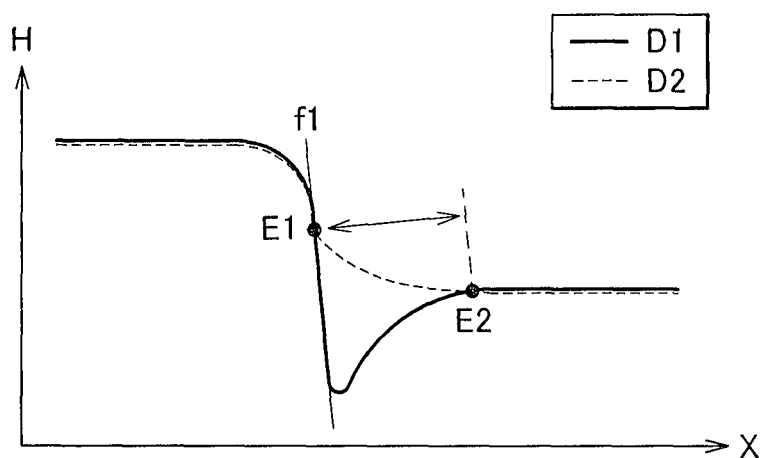
FIG. 11 is a diagram showing the bead end position difference.

As a third feature quantity, the bead end position difference [mm] will be described. The bead end position difference [mm] is a feature quantity that represents a difference in position between the two end portions of the bead B in the left-right direction which is determined with reference to the up-down-direction flat portion of the first workpiece M1. As shown in FIG. 11, a predicted value of the bead end position difference [mm] can be found by calculating the shortest distance from the point E2 to the approximate straight line f1.

Figure 12:
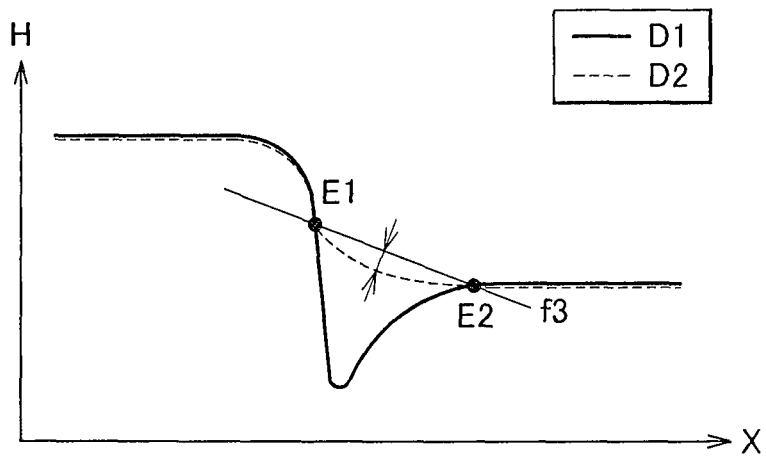
FIG. 12 is a diagram showing the bead shrinkage depth.

As a fourth feature quantity, the bead shrinkage depth [mm] will be described. The bead shrinkage depth [mm] is a feature quantity that represents the depth of shrinkage in the surface of the bead B. As shown in FIG. 12, when a predicted value of the bead shrinkage depth [mm] is to be found, firstly a straight line f3 passing through the point E1 and the point E2 is calculated. Then, the longest line segment that can be drawn, perpendicularly to the straight line f3, from the straight line f3 to a curve of the second shape data D2 between the point E1 and the point E2 is calculated. In this manner, a predicted value of the bead shrinkage depth [mm] can be found.

As a fifth feature quantity, the bead shrinkage curvature radius [mm] will be described. The bead shrinkage curvature radius [mm] is a feature quantity that represents the radius of curvature of shrinkage on the surface of the bead B. As shown in FIG. 13, a predicted value of the bead shrinkage curvature radius [mm] can be found by calculating a circle that approximates the curve of the second shape data D2 from the point E1 to the point E2 and then calculating the radius of the circle (which is the radius of curvature, with the center of curvature being a point O1 in FIG. 13).

As a sixth feature quantity, the lower surface angle [rad] will be described. The lower surface angle [rad] is a feature quantity that represents the angle of curve of the second workpiece M2. As shown in FIG. 14, when a predicted value of the lower surface angle [rad] is to be found, an approximate straight line f4 that approximates a flat portion of the first shape data D1 that extends in an up-down direction (a portion that corresponds to the up-down-direction flat portion of the first workpiece MD is calculated. Next, an approximate straight line f5 for a point-E2-side left-right-direction flat line portion of the first shape data D1 (a portion that corresponds to the left-right-direction flat portion of the second workpiece M2) is calculated. Finally, an angle that is formed by the approximate straight line f4 and the approximate straight line f5 and that is on the point E2 side of the approximate straight line f4 and on the point E1 side of the approximate straight line f5 is calculated. Thus, a predicted value of the lower surface angle [rad] can be found.

Figure 15:
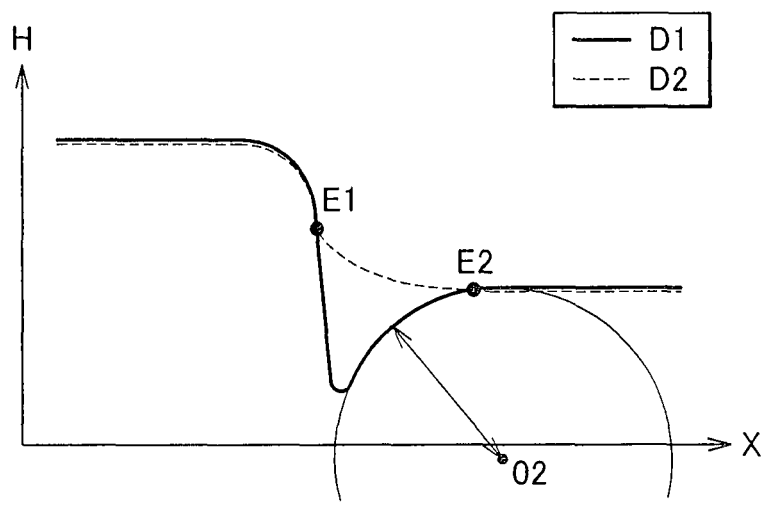
FIG. 15 is a diagram showing the lower curvature radius.

As a seventh feature quantity, the lower curvature radius [mm] will be described. The lower curvature radius [mm] is a feature quantity that represents the radius of curvature of the curved portion of the second workpiece M2. As shown in FIG. 15, a predicted value of the lower curvature radius [mm] can be found by calculating a circle that approximates a curve of a point-E2-side curved line portion of the first shape data D1 (a portion that corresponds to the curved portion of the second workpiece M2), and then calculating the radius of the circle (which is the radius of curvature, with the center of curvature being a point O2 in FIG. 15).

Figure 16:
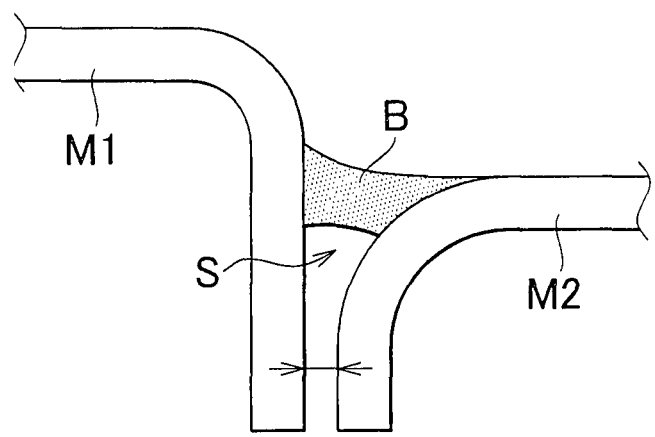
FIG. 16 is a diagram showing the plate gap.

As an eighth feature quantity, the plate gap [mm] will be described. As shown in FIG. 16, the plate gap [mm] is a feature quantity that represents the interval between the first workpiece M1 and the second workpiece M2. Incidentally, in this embodiment, it is assumed that the first workpiece M1 and the second workpiece M2 are joined in a state in which the first workpiece M1 and the second workpiece M2 are in contact with each other, that is, the plate gap [mm] is zero.

Figure 17:
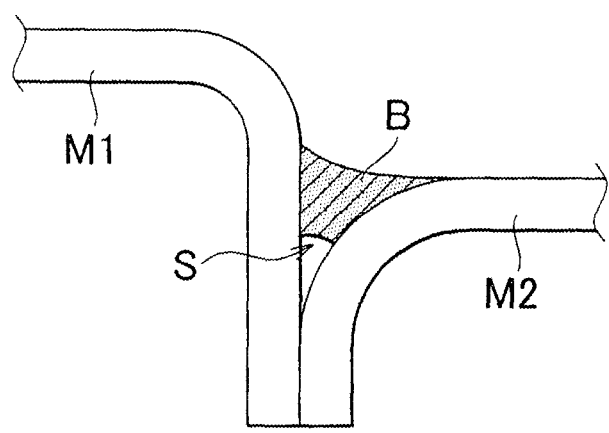
FIG. 17 is a diagram showing the bead's cross-sectional area.

As a ninth feature quantity, the bead's cross-sectional area [mm$^2$] will be described. As shown in FIG. 17, the bead's cross-sectional area [mm$^2$] is a feature quantity that represents the cross-sectional area of the bead B in a plane perpendicular to the front-rear direction.

A predicted value of the bead's cross-sectional area [mm$^2$] cannot be calculated from the first shape data D1 and the second shape data D2, and is calculated on the basis of the wire feed speed [m/min], which is closely related to the bead's cross-sectional area [mm$^2$]. The speed at which the wire feed portion 21 and the melting portion 22 are moved rearward during the brazing in the brazing step S20 is constant as described above, and the amount of brazing wire W supplied per unit time into the space S formed between the up-down-direction flat portion of the first workpiece M1 and the curved portion of the second workpiece M2 is proportional to the wire feed speed [m/min]. Besides, the amount of brazing wire W supplied to the space S per unit time is proportional to the bead's cross-sectional area [mm$^2$]. Consequently, the bead's cross-sectional area [mm$^2$] can be said to be proportional to the wire feed speed [m/min].

Since the bead's cross-sectional area [mm$^2$] is proportional to the wire feed speed [m/min] and is therefore closely related thereto as described above, it is possible to calculate a predicted value from the wire feed speed [m/min] by regression analysis. Specifically, on the basis of many actually measured and stored values of the bead's cross-sectional area [mm$^2$] relative to the wire feed speed [in/min], a regression expression shown below as Expression 1 is formed, and the wire feed speed [m/min] measured by the wire-feed-speed measurement device 11 in the brazing step S20 is substituted in the expression. In this manner, a predicted value of the bead's cross-sectional area [mm$^2$] can be statistically calculated.

Bead's cross-sectional area [mm$^2$]=$A$×wire feed speed [m/min]+$C$     [EXPRESSION 1]

where A is a coefficient, and C is a constant term.

In Expression 1, the coefficient A and the constant term C are determined on the basis of a relation between the wire feed speed [m/min] and the actual measurement of the bead's cross-sectional area [mm$^2$], and change depending on various factors such as the moving speed (brazing speed) of the wire feed portion 21 and the melting portion 22, the kind of the brazing wire W, etc.

For example, in the case where the brazing wire W used is a wire of 1.2 mm in diameter made of a Cu—Si—Mn alloy, the coefficient A in Expression 1 is 0.7327, and the constant term C is 0.1190, so that Expression 2 is formed as follows.

Bead's cross-sectional area [mm$^2$]=0.7327×wire feed speed [m/min]+0.1190     [EXPRESSION 2]

Figure 18:
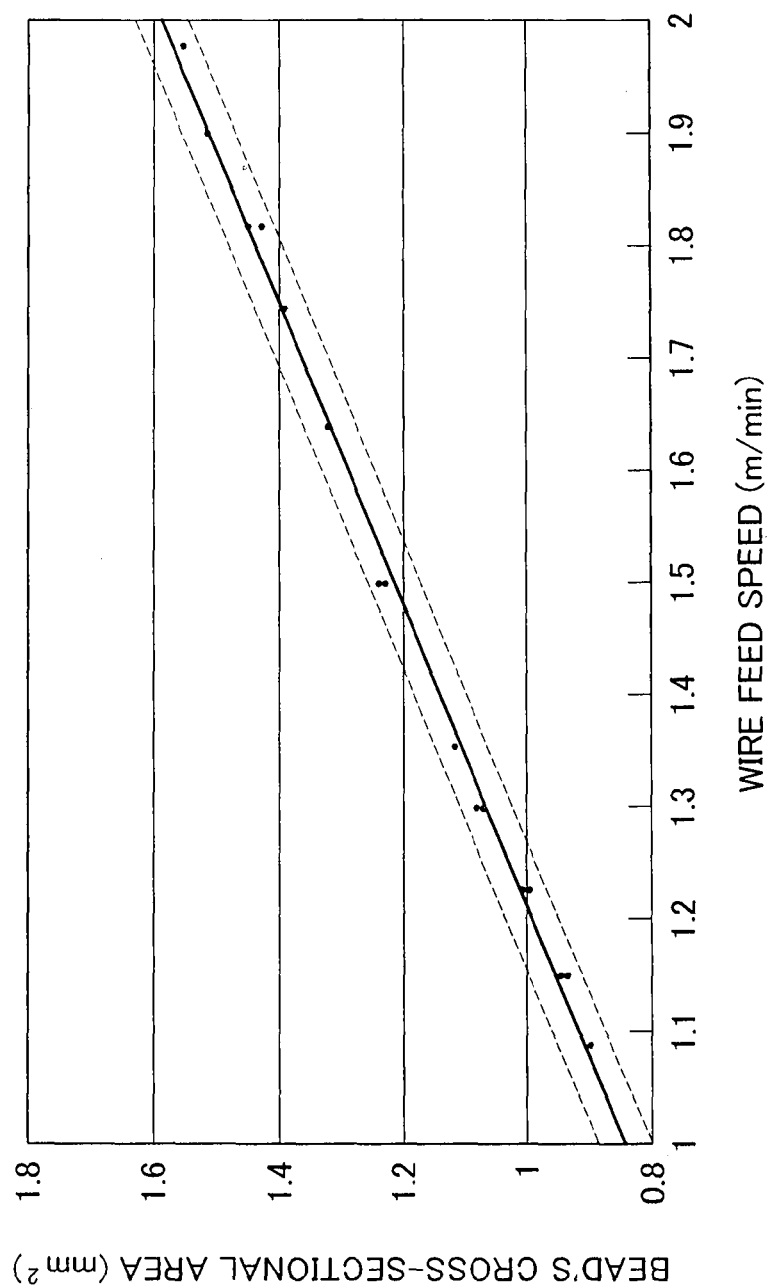
FIG. 18 is a graph showing actual measurements and predicted values of the bead's cross-sectional area relative to the wire feed speed.

Predicted values of the bead's cross-sectional area [mm$^2$] calculated by Expression 2 and actual measurements of the bead's cross-sectional area [mm$^2$] are plotted against corresponding values of the wire feed speed [in/min] (see FIG. 18). FIG. 18 is a graph showing the bead's cross-sectional area [mm$^2$] relative to the wire feed speed [in/min]. In the graph, a solid line shows a distribution of the predicted values of the bead's cross-sectional area [mm$^2$] calculated by Expression 2, and two dotted lines show a permissible range of error of the actual measurement of the bead's cross-sectional area [mm$^2$] relative to the predicted value of the bead's cross-sectional area [mm$^2$] calculated by Expression 2, and dots show a distribution of the actual measurements of the bead's cross-sectional area [mm$^2$].

As shown in FIG. 18, the actual measurements of the bead's cross-sectional area [mm$^2$] are distributed within an error range of about ±0.04 [mm$^2$] around the predicted values of the bead's cross-sectional area [mm$^2$] calculated by Expression 2, so that the bead's cross-sectional area [mm$^2$] can be predicted with high accuracy.

Thus, a predicted value of the bead's cross-sectional area [mm$^2$] can be calculated on the basis of the wire feed speed [m/min]. Therefore, regardless of the size of the bead B as an inspection object, a predicted value of the bead's cross-sectional area [mm$^2$] can be calculated without actually cutting the first workpiece M1, the second workpiece M2 or the bead B. Due to this, the cost required for the inspection of quality of the bead B can be reduced.

After calculation of predicted values of the nine kinds of feature quantities: the bead width [mm], the bead height difference [mm], the bead end position difference [mm], the bead shrinkage depth [mm], the bead shrinkage curvature radius [mm], the lower surface angle [rad], the lower curvature radius [mm], the plate gap [mm] and the bead's cross-sectional area [mm$^2$], the throat thickness calculation step S50 is performed.

The throat thickness calculation step S50 is a step in which a predicted value of the throat thickness [mm] of the bead B is calculated by the analysis portion 12 on the basis of predicted values of the nine kinds of feature quantities calculated in the feature quantity calculation step S40. Predicted values of the throat thickness [mm] are calculated for every one line (one section), similarly to the predicted values of the feature quantities, and Ny number of predicted values of the throat thickness [mm] can be calculated. The throat thickness calculation step S50 will be described, with the number of line being limited to one.

In the throat thickness calculation step S50, a regression expression as in Expression 3 below is formed on the basis of many accumulated pieces of information that show actual measurements of the throat thickness [mm] that correspond to actual measurements of the nine kinds of feature quantities. By substituting the predicted values of the nine kinds of feature quantities calculated in the feature quantity calculation step S40 in Expression 3, a predicted value of the throat thickness [mm] is statistically calculated.

Throat thickness [mm] = $A1$ × bead width [mm] +     [EXPRESSION 3]

$A2$ × bead height difference [mm] +

$A3$ × bead end position difference [mm] +

$A4$ × bead shrinkage depth [mm] +

$A5$ × bead shrinkage curvature radius [mm] +

$A6$ × lower surface angle [rad] +

$A7$ × lower curvature radius [mm] +

$A8$ × plate gap [mm] +

$A9$ × bead's cross-sectional area [mm$^2$] + $C1$ where A1 to A9 are coefficients, and C1 is a constant term.

That is, in the regression expression shown as Expression 3, a predicted value of the throat thickness [mm] is calculated by multiplying the predicted value of each of the feature quantities that affect the throat thickness [mm] by a predetermined coefficient, and summing the multiplication products of the feature quantities and their respective coefficients. In Expression 3, the coefficients A1 to A9 and the constant term C1 are determined on the basis of relations between actual measurements of the nine kinds of feature quantities and actual measurements of the throat thickness [mm], and change depending on various factors such as the shapes of the first workpiece M1, the second workpiece M2 and the bead B, the kind of the brazing wire W, etc.

Besides, of the nine kinds of feature quantities, there exist one or more feature quantities that are not closely related to the throat thickness [mm], depending on various factors such as the shapes of the first workpiece M1, the second workpiece M2 and the bead B, the kind of the brazing wire W, etc. Therefore, a multiple-variables' association chart that shows relations between the accumulated actual measurements of the nine kinds of feature quantities and the accumulated actual measurements of the throat thickness [mm] is formed. Only the feature quantity or quantities that exhibit a tendency of being closely related with the throat thickness [mm], that is, exhibit conspicuous regularity in the association with the throat thickness [mm], such as a proportional relation or the like, are extracted from the nine feature quantities. The rest of the feature quantities are excluded from Expression 3. In this embodiment, the bead height difference [mm], the bead shrinkage depth [mm], and the bead's cross-sectional area [mm$^2$] were found to have a tendency of being closely related with the throat thickness [mm] (e.g., a proportional relation, or the like).

In this manner, relations of the throat thickness [mm] with the beat height difference [mm], the bead shrinkage depth [mm], and the bead cross-sectional area [mm$^2$] can be expressed as in a regression expression in Expression 4 below.

$$\text{Throat thickness [mm]} = \quad [\text{EXPRESSION 4}]$$
$$A2 \times \text{bead height difference [mm]} +$$
$$A4 \times \text{bead shrinkage depth [mm]} +$$
$$A9 \times \text{bead's cross-sectional area [mm}^2] + C2$$

where A2, A4 and A9 are coefficients, and C2 is a constant term.

Figure 19:
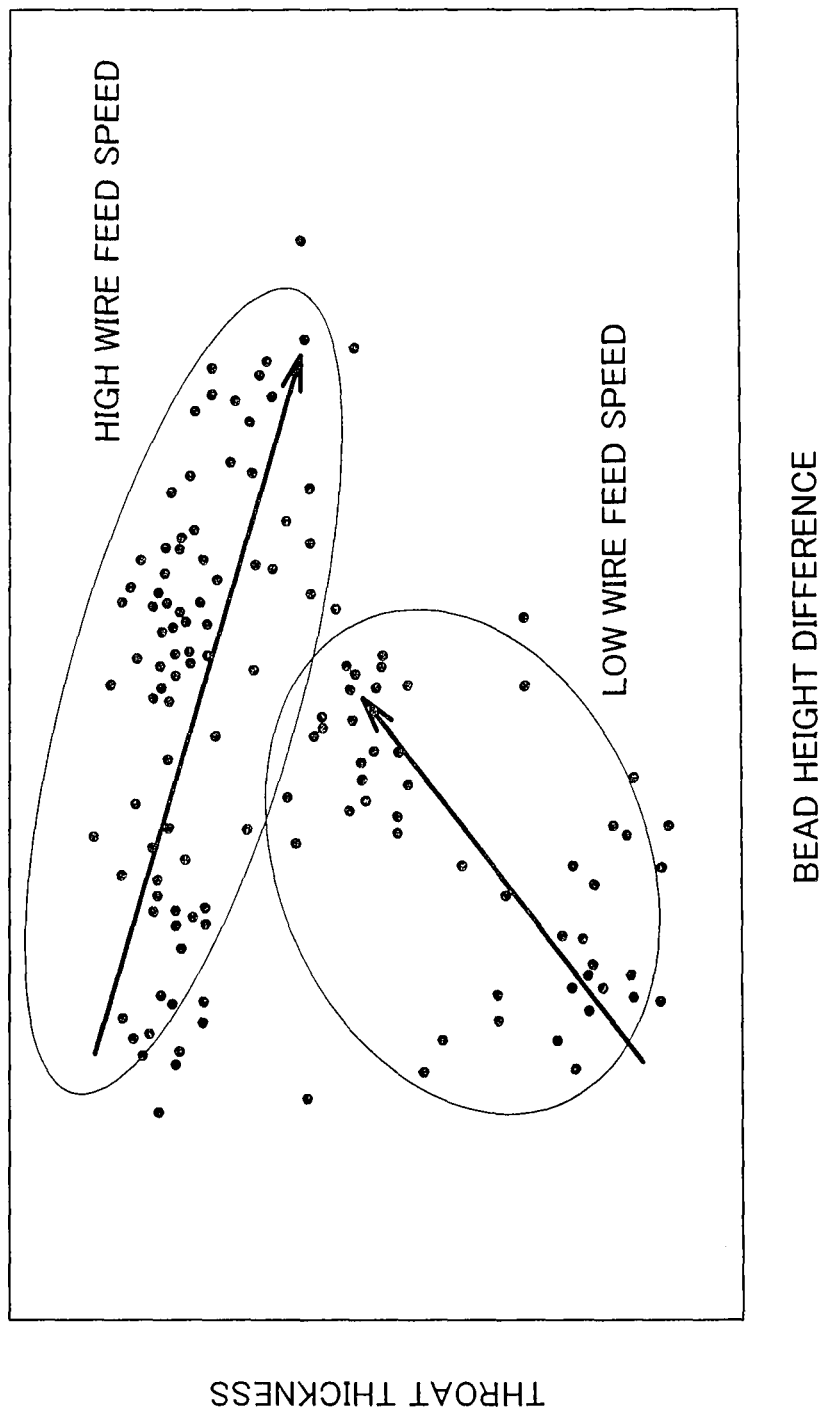
FIG. 19 is a graph showing distributions of actual measurements of the throat thickness relative to actual measurements of the bead height difference.

Besides, the bead height difference [mm] exhibits difference tendencies in the relation with the throat thickness [mm], depending on the magnitude of the wire feed speed [m/min] (see FIG. 19). FIG. 19 is a graph showing distributions of actual measurements of the throat thickness [mm] relative to actual measurements of the bead height difference [mm]. As shown in FIG. 19, an area with a tendency of general increase shows a distribution of actual measurements of the throat thickness [mm] relative to actual measurements of the bead height difference [mm] in the case where the wire feed speed [m/min] is relatively small, and an area with a tendency of general decline shows a distribution of actual measurements of the throat thickness [mm] relative to actual measurements of the bead height difference. [mm] in the case where the wire feed speed [m/min] is relatively large.

In the case where different tendencies are exhibited in the relation between the bead height difference [mm] and the throat thickness [mm], depending on the magnitude of the wire feed speed [m/min], it is also permissible to statistically calculate a predicted value of the throat thickness [mm] by using a regression expression as shown in Expression 5 below that is formed through the use of the bead's cross-sectional area [mm$^2$], which is closely related with the wire feed speed [m/min], by taking into account a different tendency in the relation between the bead height difference [mm] and the throat thickness [mm]. Besides, in Expression 5, the average of the bead's cross-sectional area [mm$^2$] is an average value of many accumulated actual measurements of the bead's cross-sectional area [mm$^2$], and the average of the bead height difference [mm] is an average of many accumulated actual measurements of the bead height difference [mm].

$$[\text{EXPRESSION 5}]$$
$$\text{Throat thickness [mm]} = A2 \times \text{bead height difference [mm]} +$$
$$A4 \times \text{bead shrinkage depth [mm]} +$$
$$A9 \times \text{bead's cross-sectional area [mm}^2] +$$
$$A10 \times (\text{bead's cross-sectional area [mm}^2] -$$
$$\text{average of bead's cross-sectional area [mm}^2]) \times$$
$$(\text{bead height difference [mm]} -$$
$$\text{average of bead height difference [mm]}) + C3$$

where A2, A4, A9 and A10 are coefficients, and C3 is a constant term.

For example, in the case where the brazing wire W is a wire of 1.2 mm in diameter made of a Cu—Si—Mn alloy, the coefficient A in Expression 5 is 0.0664, and the coefficient A4 is 0.2647, and the coefficient A9 is 0.5931, and the coefficient A10 is (−0.2103), and the constant term C3 is 0.13279. Furthermore, by substituting Expression 2 for the bead's cross-sectional area [mm$^2$] in Expression 5, Expression 6 shown below is formed.

$$\text{Throat thickness [mm]} = \quad [\text{EXPRESSION 6}]$$
$$0.0664 \times \text{bead height difference [mm]} +$$
$$0.2647 \times \text{bead shrinkage depth [mm]} + 0.5931 \times$$
$$(0.7327 \times \text{wire feed speed [m/min]} + 0.1190) +$$
$$(-0.2103) \times ((0.7327 \times \text{wire feed speed [m/min]} +$$
$$0.1190) - 0.9404) \times$$
$$(\text{bead height difference [mm]} - 0.9588) +$$
$$0.13279$$

Figure 20:
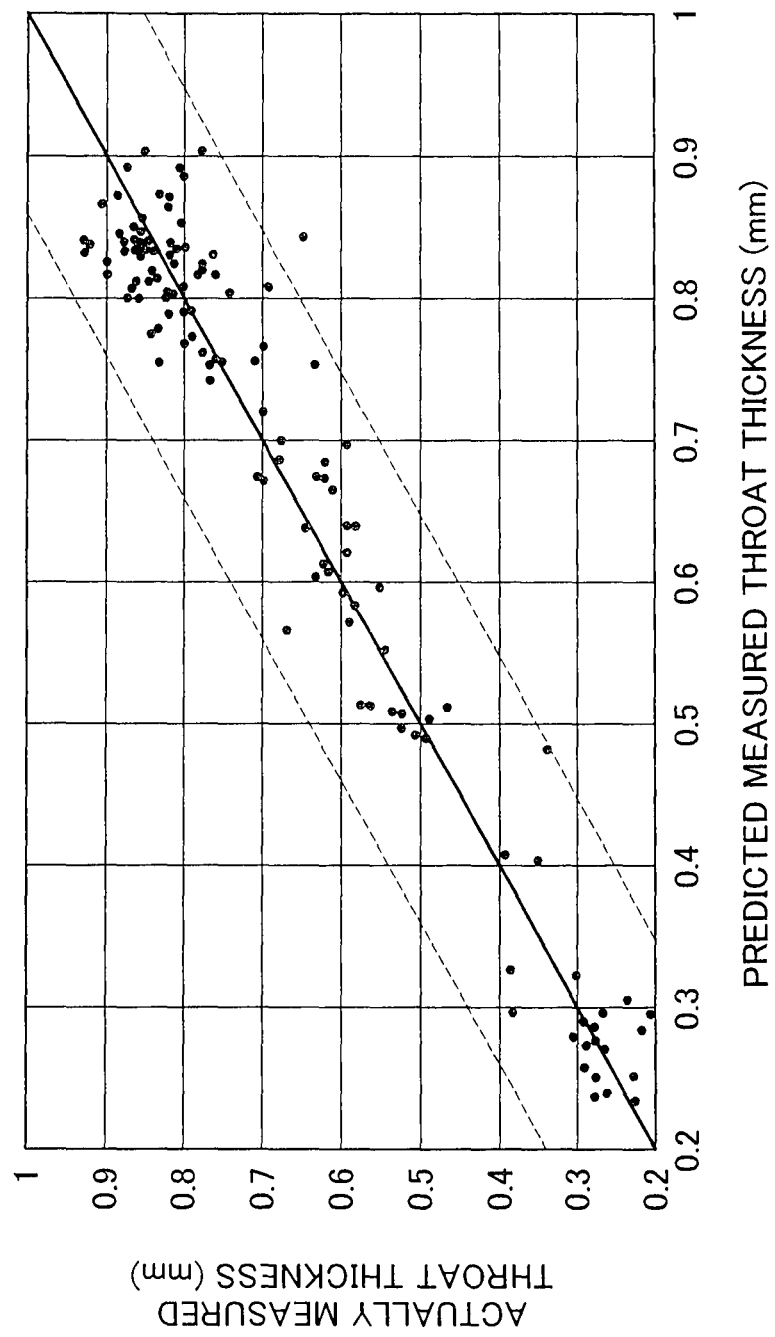
FIG. 20 is a graph showing a relation between actual measurements of the throat thickness and predicted values of the throat thickness.
Figure 21:
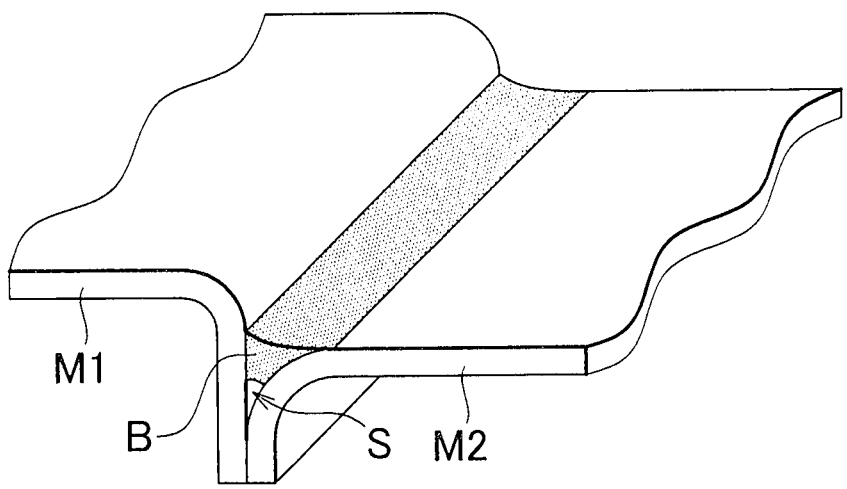
FIG. 21 is a diagram showing a first workpiece and a second workpiece that are joined by a bead according to a related-art technology.

The predicted values of the throat thickness [mm] calculated by Expression 6 and actual measurements of the throat thickness [mm] are plotted (see FIG. 20). FIG. 20 is a graph showing a relation between the predicted values of the throat thickness [mm] calculated by Expression 6 and actual measurements of the throat thickness [mm] of portions where the first shape data D1 and the second shape data D2 are measured in order to calculate the predicted values of the throat thickness [mm]. In the graph, a solid line shows positions at which predicted values of the throat thickness [mm] calculated by Expression 6 perfectly coincide with actual measurements of the throat thickness [mm], and two dotted lines show a permissible range of error of the actual measurement of the throat thickness [mm] from the predicted value of the throat thickness [mm] calculated by Expression 6, and dots show a distribution of the actual measurements of the throat thickness [mm] relative to the predicted values of the throat thickness [mm] calculated by Expression 6.

As shown in FIG. 20, the error of the predicted values of the throat thickness [mm] calculated by Expression 6 from the corresponding actual measurements of the throat thickness [mm] is about ±0.14 [mm]. Thus, the throat thickness [mm] can be predicted with high accuracy. Incidentally, the determination regarding the predicted value of the throat thickness [mm] may be performed by taking the error into account.

Thus, regardless of the size of the bead B as an inspection object, it is possible to predict, with high accuracy, a throat thickness [mm] of the bead B from feature quantities, that is, shape information regarding specific portions of the first workpiece M1, the second workpiece M2 and the bead B, without a need to actually cut the first workpiece M1, the second workpiece M2 or the bead B. Due to this, destructive inspection becomes unnecessary, and therefore the number of man-hours for the inspection of quality of the bead B and the number of waste works can be reduced. Therefore, the quality of the bead B can be inspected at low cost. Besides, it becomes possible to perform the one-hundred-percent inspection, so that the quality of the products improves, and abnormalities in the brazing process or the like can be detected in an early period.

After predicted values of the throat thickness [mm] are calculated on the basis of the nine kinds of feature quantities calculated in the feature quantity calculation step S40, it is determined by the analysis portion 12 whether or not the calculated predicted values of the throat thickness [mm] are within the range between a pre-set upper-limit value and a pre-set lower-limit value (good/bad determination regarding the throat thickness). The analysis portion 12 determines that the first workpiece M1 and the second workpiece M2 having been brazed are good if the calculated predicted values of the throat thickness [mm] are within the range. If not, the analysis portion 12 determines that the first workpiece M1 and the second workpiece M2 having been brazed are bad.

As described above, the quality of the bead B is inspected through the bead inspection step S1 in which the first shape data measurement step S10, the brazing step S20, the second shape data measurement step S30, the feature quantity calculation step S40 and the throat thickness calculation step S50 are performed in that order. Incidentally, if the two end portions of the bead B can be detected only from the second shape data D2, it is not necessary to perform the first shape data measurement step S10 in order to measure the first shape data D1. Besides, the first shape data D1 may be stored beforehand as master data. Besides, although in this embodiment predicted values of the nine kinds of feature quantities are calculated, it is also permissible to adopt a construction in which at least one of the nine kinds of feature quantities is calculated, or to adopt a construction in which predicted values of only one or more feature quantities that have a tendency of being closely related with the throat thickness [mm] are calculated. Besides, in the embodiment, the first workpiece M1 has a shape that includes a curved portion. However, regardless of the presence/absence of a curved portion of the first workpiece M1, a space S may be formed between an up-down-direction flat portion of a first workpiece M1 and a curved portion of a second workpiece M2, and a bead B may be formed extending between the up-down-direction flat portion of the first workpiece M1 and the curved portion of the second workpiece M2.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A bead inspection method of inspecting quality of a bead, comprising:
 forming the bead by melting a brazing wire that is supplied to a joining portion between a plurality of metal workpieces so as to braze the metal workpieces together;
 forming a regression expression, using an analysis portion, based on an actual measurement of a feature quantity that is information about a shape of a specific portion of the metal workpieces and the bead and that affects throat thickness of the bead, and on an actual measurement of the throat thickness corresponding to the actual measurement of the feature quantity;
 calculating, using the analysis portion, a predicted value of the throat thickness by the regression expression; and
 determining whether or not the bead is good by comparing the predicted value of the throat thickness with a pre-set criterion value.

2. The bead inspection method according to claim 1, wherein:
 the plurality of metal workpieces are two metal plates;
 the bead is formed in a space that is formed by placing the two metal plates so that surfaces of the two metal plates are near to each other, one metal plate of which is curved in a direction away from the other metal plate; and
 the feature quantity includes at least one of bead width, bead height difference, bead end position difference, bead shrinkage depth, bead shrinkage curvature radius, lower surface angle, lower curvature radius, plate gap and bead's cross-sectional area.

3. The bead inspection method according to claim 2, wherein the feature quantity includes the bead height difference, the bead shrinkage depth, and the bead's cross-sectional area.

4. The bead inspection method according to claim 2, wherein a predicted value of the bead's cross-sectional area is calculated, using the analysis portion, by a regression expression that is formed based on supply speed of the brazing wire and an actual value of the bead's cross-sectional area.

5. The bead inspection method according to claim 1, wherein the feature quantity is information about a shape of the metal workpieces and the bead which is acquired from outside the metal workpieces and the bead without destroying any one of the metal workpieces nor the bead.

6. The bead inspection method according to claim 1, wherein the throat thickness of the bead is a smallest size of a dimension of the bead between a brazing surface of the bead and a surface opposite the brazing surface in a cross-sectional plane of the bead that is perpendicular to a brazing direction in which the metal workpieces are brazed to each other.

7. The bead inspection method according to claim 1, wherein determining whether or not the bead is good includes determining whether or not the predicted value of the throat thickness satisfies a criterion.

8. The bead inspection method according claim 1, wherein determining whether or not the bead is good includes determining whether or not the predicted value calculated about the throat thickness is within a range between a pre-set upper-limit value and a pre-set lower-limit value.

9. The bead inspection method according to claim 1, wherein during the forming, the brazing wire is substantially continuously supplied to the joining portion.

10. A bead inspection apparatus that inspects quality of a bead that is formed by melting a brazing wire that is substantially continuously supplied to a joining portion between a plurality of metal workpieces so as to braze the metal workpieces to each other, comprising:
 a wire-supply-speed measurement portion that measures supply speed of the brazing wire that is substantially continuously supplied to the joining portion between the metal workpieces; and
 an analysis portion that measures and analyzes position coordinate data about surfaces of the metal workpieces and of the bead,
 wherein the analysis portion
 measures first shape data that is data regarding position coordinates of surfaces of the metal workpieces that include the joining portion in a state prior to brazing, measures, at same position as a position at which the first shape data is measured, second shape data that is data regarding position coordinates about the surfaces of the metal workpieces and of the bead after the brazing, calculating a predicted value of a feature quantity that is information regarding a shape of a specific portion of the metal workpieces and of the bead and that affects a throat thickness of the bead, based on the first shape data, the second shape data, and the supply speed of the brazing wire, and calculates a predicted value of the throat thickness by substituting the predicted value of the feature quantity in a regression expression formed based on an actual measurement of the feature quantity and an actual measurement of the throat thickness corresponding to the actual measurement of the feature quantity, and then determines whether or not the bead is good by comparing the predicted value of the throat thickness with a pre-set criterion value.

11. The bead inspection apparatus according to claim 10, wherein the feature quantity is information about a shape of the metal workpieces and the bead which is acquired from outside the metal workpieces and the bead without destroying any one of the metal workpieces nor the bead.

12. The bead inspection apparatus according to claim 10, wherein the throat thickness of the bead is a smallest size of a dimension of the bead between a brazing surface of the bead and a surface opposite the brazing surface in a cross-sectional plane of the bead that is perpendicular to a brazing direction in which the metal workpieces are brazed to each other.

13. The bead inspection apparatus according to claim 10, wherein determining whether or not the bead is good is determining whether or not the predicted value of the throat thickness satisfies a criterion.

14. The bead inspection apparatus according to claim 10, wherein determining whether or not the bead is good is determining whether or not the predicted value calculated about the throat thickness is within a range between a pre-set upper-limit value and a pre-set lower-limit value.

* * * * *